US009564983B1

(12) United States Patent
Cao et al.

(10) Patent No.: US 9,564,983 B1
(45) Date of Patent: Feb. 7, 2017

(54) ENABLEMENT OF A PRIVATE PHONE CONVERSATION

(71) Applicant: International Business Machines Corporation, Armonk, NY (US)

(72) Inventors: Feng Cao, ShangHai (CN); Xing Zhi Sun, Beijing (CN); Jianbin Tang, Melbourne (AU); Yini Wang, Melbourne (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/884,817

(22) Filed: Oct. 16, 2015

(51) Int. Cl.
  *H04K 3/00* (2006.01)
  *H04W 28/02* (2009.01)
  *H04L 12/26* (2006.01)
  *H04W 12/02* (2009.01)

(52) U.S. Cl.
  CPC .............. *H04K 3/45* (2013.01); *H04L 43/16* (2013.01); *H04W 12/02* (2013.01); *H04W 28/0236* (2013.01)

(58) Field of Classification Search
  USPC ............ 455/1, 550.1, 67.11, 67.13, 63.1
  See application file for complete search history.

(56) References Cited

U.S. PATENT DOCUMENTS

| 7,505,898 | B2 | 3/2009 | Hillis et al. |
| 8,194,871 | B2 | 6/2012 | Sweeney et al. |
| 8,229,130 | B2 | 7/2012 | Paradiso et al. |
| 2002/0131581 | A1 | 9/2002 | Wittke et al. |
| 2006/0109983 | A1 | 5/2006 | Young et al. |
| 2006/0247919 | A1 | 11/2006 | DeKruif et al. |
| 2011/0105034 | A1 | 5/2011 | Senders et al. |
| 2013/0244630 | A1 | 9/2013 | Mikan et al. |
| 2013/0317809 | A1* | 11/2013 | Holzrichter .......... G10K 11/175 704/201 |
| 2014/0006017 | A1* | 1/2014 | Sen ....................... G10L 21/003 704/208 |

OTHER PUBLICATIONS

Yi-Bing Lin et al., "Eavesdropping Through Mobile Phone", IEEE Transactions on Vehicular Technology, Nov. 19, 2007, 3596-3600, 56 (6), IEEE. http://ieeexplore.ieee.org/xpl/login.jsp?tp=&arnumber=4356948&url=http%3A%2F%2Fieeexplore.ieee.org%2Fiel5%2F25%2F4356907%20F04356948.pdf%3Farnumber%3D4356948.

David Ponevac, "Effects of Line Delay and Noise on Bystanders' Perceptions of Mobile Phone Conversations", ETD Collection for University of Texas, El Paso, Jan. 1, 2006, the University of Texas at El Paso, El Paso, TX. http://digitalcommons.utep.edu/dissertations/AAI1439468.

* cited by examiner

*Primary Examiner* — Fayyaz Alam
(74) *Attorney, Agent, or Firm* — Cantor Colburn LLP; Kevin Jordan

(57) ABSTRACT

A method, system, and computer program product for enablement of a phone conversation. The method includes receiving a combined signal including an interference signal and a first voice signal from a first user having a communication with a second user. The interference signal can be used to prevent the first voice signal from being overheard by people near the first user. The first voice signal can be extracted from the combined signal based at least in part on the interference signal and transmitting the extracted first voice signal to the second user. The system and computer program product are also provided.

18 Claims, 5 Drawing Sheets

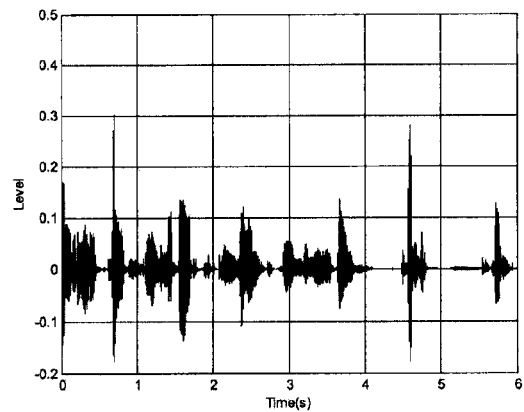 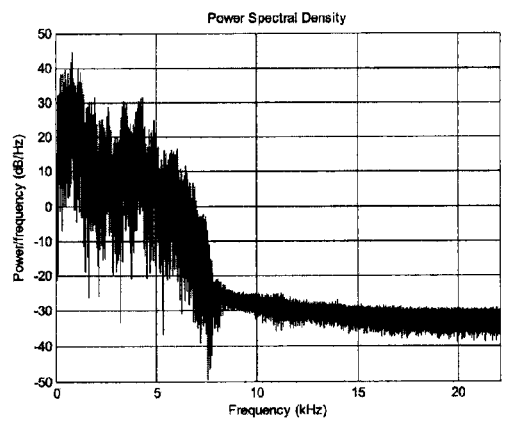
Figure 3(a)　　　　　　　　　　Figure 3(b)
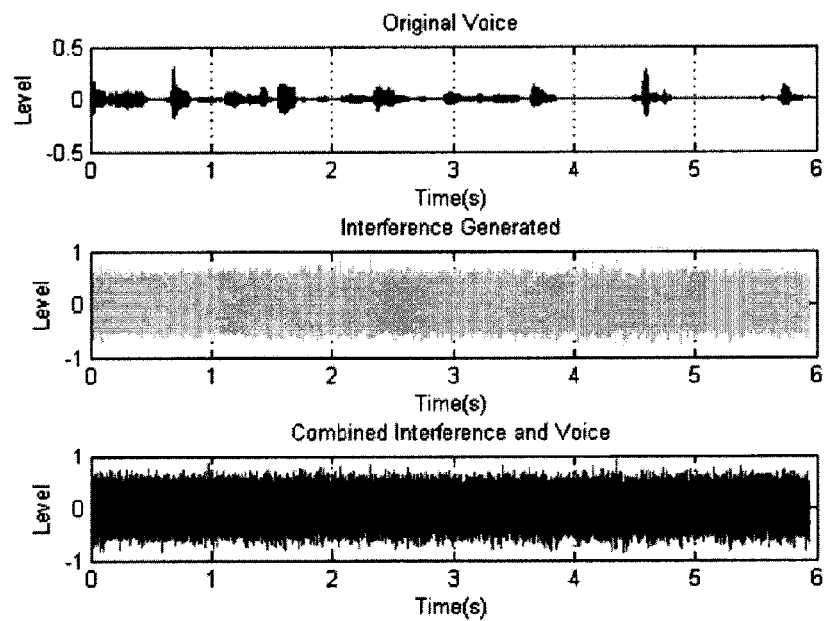
Figure 4

ENABLEMENT OF A PRIVATE PHONE CONVERSATION

BACKGROUND

The present invention relates to communication applications, and more specifically, to phone conversations.

The development of communication technologies has contributed to an insatiable desire for new functionality. Communication applications, especially mobile applications, have become more and more popular in daily life. Making a call is one of the most basic requirements for daily communications. However, people are disturbed by having their conversations overheard especially when making a call in the public areas.

SUMMARY

According to one embodiment of the present invention, there is provided a method. The method can include receiving a combined signal including an interference signal and a first voice signal from a first user having a communication with a second user. The interference signal can be used to prevent the first voice signal from being overheard by people near the first user. The first voice signal can be extracted from the combined signal based at least in part on the interference signal and transmitting the extracted first voice signal to the second user.

According to another embodiment of the present invention, there is provided a system. The system can include at least one processor, a memory coupled to at least one of the processors, and a set of computer program instructions stored in the memory. The set of computer program instructions can be executed by at least one of the processors in order to perform an action of receiving a combined signal including an interference signal and a first voice signal from a first user having a communication with a second user. The interference signal can be used to prevent the first voice signal from being overheard by people near the first user. The first voice signal can be extracted from the combined signal based at least in part on the interference signal. The set of computer program instructions can be executed by at least one of the processors in order to further perform an action of transmitting the extracted first voice signal to the second user.

According to still another embodiment of the present invention, there is provided a computer program product. The computer program product can include a computer readable storage medium having program instructions embodied therewith. The program instructions can be executable by a processor to cause a user device to receive a combined signal including an interference signal and a first voice signal from a first user having a communication with a second user. The interference signal can be used to prevent the first voice signal from being overheard by people near the first user. The first voice signal can be extracted from the combined signal based at least in part on the interference signal. The program instructions can be executable by the processor to cause the user device further to transmit the extracted first voice signal to the second user.

BRIEF DESCRIPTION OF THE DRAWINGS

Through the more detailed description of the embodiments of the present invention in the accompanying drawings, the above and other objects, features and advantages of the present invention will become more apparent, wherein the same reference generally refers to the same components in the embodiments of the present invention.

FIG. 3($a$) shows a voice signal in the frequency domain, in accordance with an embodiment of the present invention;

FIG. 3($b$) shows a voice signal in time domain, in accordance with an embodiment of the present invention;

FIG. 4 shows a first example of interference signal generation in accordance with an embodiment of the present invention;

DETAILED DESCRIPTION

Some preferable embodiments will be described in more detail with reference to the accompanying drawings, in which the preferable embodiments of the present invention have been illustrated. However, the present invention can be implemented in various manners, and thus should not be construed to be limited to the embodiments disclosed herein. On the contrary, those embodiments are provided for the thorough and complete understanding of the present invention, and completely conveying the scope of the present invention to those skilled in the art.

Figure 1:
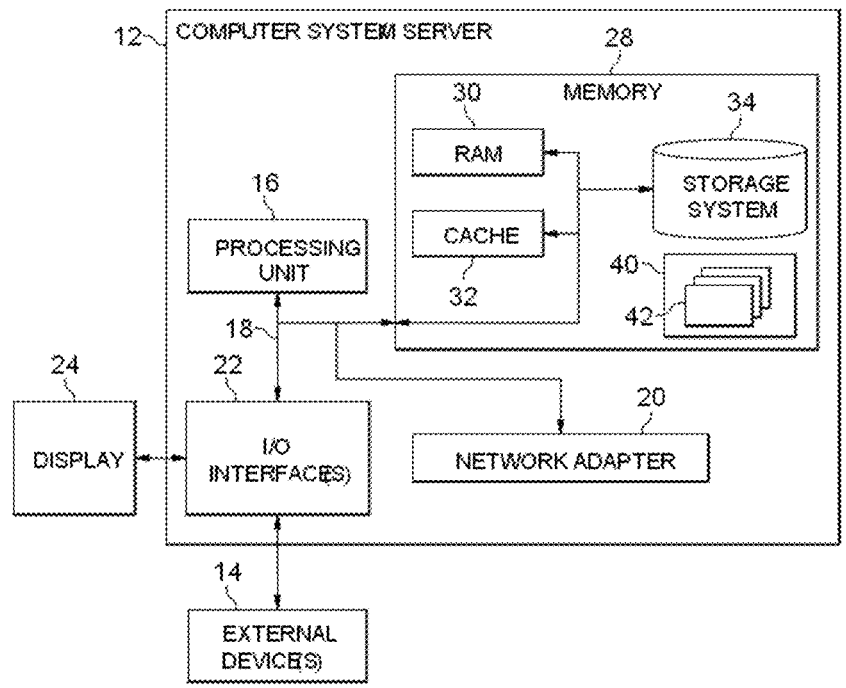
FIG. 1 shows an exemplary computer system which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein. Computer system/server 12 is shown in the form of a general-purpose computing device. The components of computer system/server 12 can include, but are not limited to, at least one processor or processing units 16, a system memory 28, and a bus 18 that couples various system components including system memory 28 to processor 16.

Bus 18 represents at least any one of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. For example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interface. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, at least one application program, other program modules, and program data. Each of the operating system, at least one application program, other program modules, and program data or some combination thereof, can include an implementation of a networking environment. Program modules 42 generally carry out the functions and/or methodologies of embodiments of the invention as described herein.

Computer system/server 12 can also communicate with at least one external device 14 such as a keyboard, a pointing device, a display 24; at least one device that enables a user to interact with computer system/server 12; and/or any devices (e.g., network card, modem, etc.) that enable computer system/server 12 to communicate with at least one other computing device. Such communication can occur via Input/Output (I/O) interfaces 22. Still yet, computer system/server 12 can communicate with at least one network such as a local area network (LAN), a general wide area network (WAN), and/or a public network (e.g., the Internet) via network adapter 20. Network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Personal communication technologies have addressed related consumer demands, while providing more flexibility and immediacy of information transfer. One area of interest is the development of services and technologies for enabling people to have a private phone conversation in a public place. An example scenario is that, in an office, a person named Bob wants to make/take a private call from his mobile phone/landline. He does not want colleagues nearby to hear the conversation. Naturally, Bob wants his voice to be transformed so that the colleagues cannot understand it. Also, the person at the other end of the call needs to hear Bob's original voice. Furthermore, Bob does not want his transformed voice bothering his colleagues too much.

Some related approaches for voice encryption and voice transformation can be considered, which aim to transform a voice into a new signal such that the new voice becomes not interpretable, or a speaker cannot be recognized based on his/her voice. Normally, the voice transformation can be achieved by adding-on tailored interference signal, and the transformed voice can be restored to the original voice if the interference signal is "subtracted" from the transformed voice signal. As such, the voice of the speaker can be protected from the people who can intercept the voice signals. However, the privacy of the phone speaker can not be protected from the people nearby. In other words, people near the phone speaker can not be prevented from overhearing the phone conversion. Therefore, a more efficient solution is desirable to allow people to make private phone calls at public places.

Figure 2:
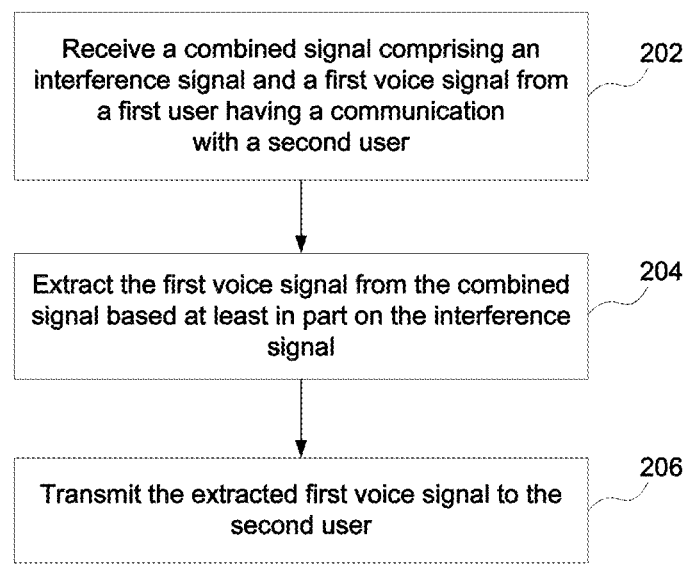
FIG. 2 is a flowchart illustrating the process for enablement of a private phone conversation, which can be performed at a user device in accordance with an embodiment of the present invention.
Figure 5:
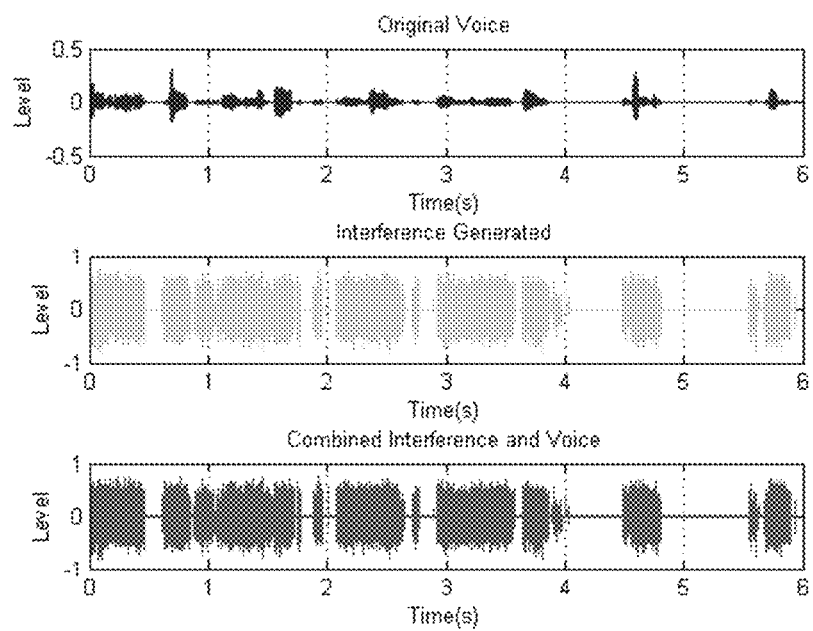
FIG. 5 shows a second example of interference signal generation in accordance with an embodiment of the present invention.
Figure 6:
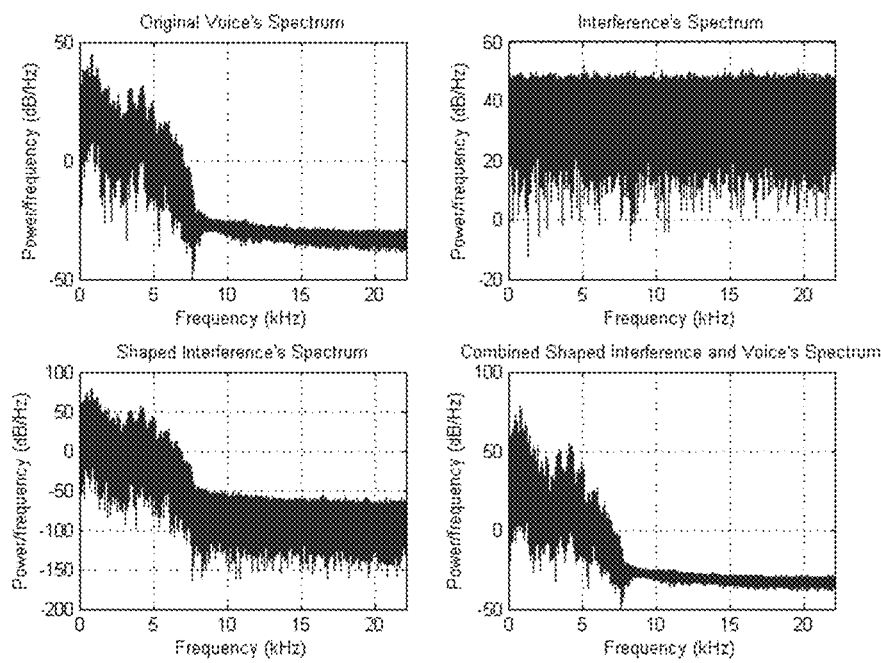
FIG. 6 shows a third example of interference signal generation in accordance with an embodiment of the present invention.

With reference now to FIG. 2, which is a flowchart illustrating the process for enablement of a private phone conversation in accordance with an embodiment. The process can be performed at a user device through which a first user can have a call with a second user. It is contemplated that the user device can be any type of apparatus with capability of communications and/or assisting in communications, such as mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), headset device, wearable device, or any combination thereof, including the accessories and peripherals of these devices, or any combination thereof. For example, the device designed according to the exemplary embodiment can be integrated into a phone (such as a landline/mobile phone) or a headset. Also, it can be a component of any mobile or fixed devices required to prevent from overhearing.

As shown in FIG. 2, a combined signal can be received in block 202, for example at the user device of the first user. The combined signal can include an interference signal and a first voice signal from the first user having a communication with the second user. According to an exemplary embodiment, the interference signal can be used to prevent the first voice signal from being overheard by people near the first user.

According to an exemplary embodiment, the interference signal can include an Environment Noise ("EN") of the first user. Additionally or optionally, in response to quality of the first voice signal relative to the EN being higher than a predetermined threshold, an additional signal can be generated based at least in part on the first voice signal and the EN, and sent out as interference. In this case, the interference signal can further include the additional signal. For example, the additional signal can be associated with at least one of: voice characteristics of the first user in time domain, voice characteristics of the first user in frequency domain, and words spoken by the first user. In an exemplary embodiment, the extracted first voice signal can be provided to the first user along with a second voice signal from the second user. In another exemplary embodiment, the interference signal can be adjusted adaptively according to changes of the first voice signal and the EN during the communication between the first user and the second user.

EN has been studied in the context of phone conversations. Conventionally, the impact of EN is removed in order to improve the quality of voice. According to an exemplary embodiment, the EN can be leveraged as a source of the interference signal in the voice transformation. Typically, it can be more preferable to add to a speaker's voice a certain amount of interference which not only makes the speaker's voice become not understandable but also limits the impact to people near the speaker as much as possible.

For example, the interference signal can include the EN of the first user. If the EN is strong enough to prevent people near the first user from overhearing the communication/ conversation between the first user and the second user, it can be unnecessary to generate an additional signal as interference at all. In response to quality of the first voice signal relative to the EN being higher than a predetermined threshold, an additional signal can be generated based at least in part on the first voice signal and the EN. The generated additional signal can be sent out, for example by the user device of the first user. In this case, the interference signal can further include the generated additional signal. The additional signal can be generated so that the quality of the first voice signal relative to the interference signal is not higher than the predetermined threshold. As such, the first user's voice added with the interference signal including the additional signal and the EN cannot be understood by the people nearby. In an exemplary embodiment, the interference signal with same frequency but opposite vibration direction of the speaker's own voice signal can be added. It can perfectly cancel the speaker's voice and will not disturb the people nearby.

According to an exemplary embodiment, in order to generate a certain amount of interference, the characteristics of a speaker's voice may need to be considered. For example, training can be employed to capture the speaker's voice characteristics such as volume, frequency, speed, and so on. The training can be done either before a call (for example, by asking the speaker such as the first user described in FIG. 2 to read at least one sample sentence in the normal status) or during the call. Then the speaker's voice characteristics can be recorded and prepared for generating appropriate interference. According to an exemplary embodiment, the additional signal described with respect to FIG. 2, which is generated as a part of the interference signal, can be associated with at least one of: voice characteristics of the first user in time domain, voice characteristics of the first user in frequency domain, and words spoken by the first user.

FIG. 3(a) and FIG. 3(b) exemplarily show a voice signal in the time domain and frequency domain respectively, in accordance with an embodiment of the present invention. The voice characteristics of the speaker can be learned by analyzing the corresponding voice signal in time domain and frequency domain. For example, the voice characteristics in time domain can reflect the strength and discontinuity of the speaker's voice, such as those bursts with different levels occurring in specific durations of time, as shown in FIG. 3. The voice characteristics in frequency domain can reflect the power spectral density of the corresponding voice signal, for example having higher power/energy within a specific frequency region such as 0-8 kHz, as shown in FIG. 3. Such characteristics of the voice signal in time domain and/or in frequency domain can be utilized in generating the interference signal for the speaker.

Figure 7:
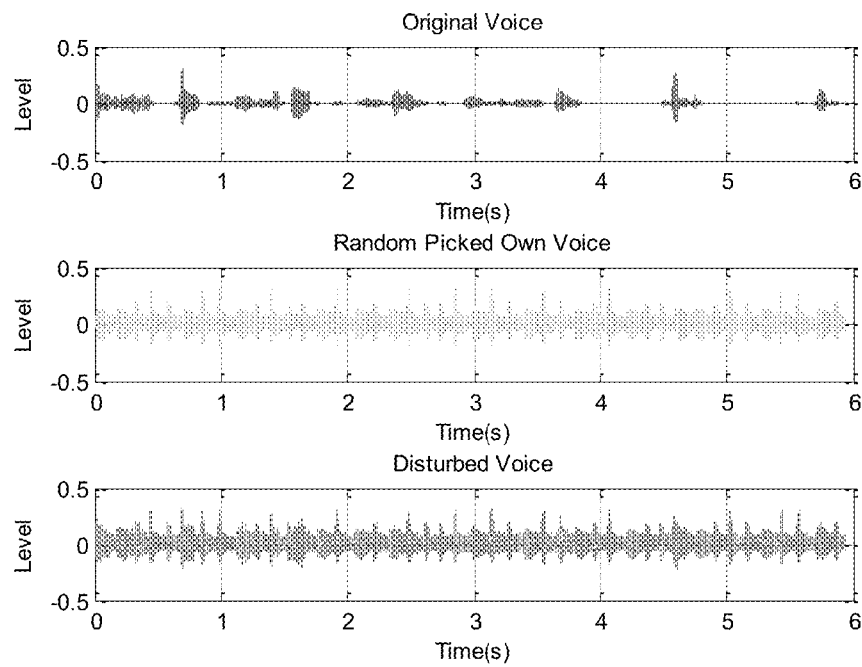
FIG. 7 shows a fourth example of interference signal generation in accordance with an embodiment of the present invention.

FIGS. 4-7 respectively show different examples of interference signal generation in accordance with various exemplary embodiments of the present invention. It is noted that the interference signal herein can refer to the EN processed as interference, the additional signal specially generated as interference, and/or a combination thereof. In an exemplary approach shown in FIG. 4, an interference signal is generated in a full time/frequency domain of an original voice signal, without considering the discontinuity of the original voice signal. The resulted signal by combining the interference signal and the original voice signal is thus distributed in a full time/frequency domain of the original voice signal. This approach is effective but consuming more energy. In an alternative approach shown in FIG. 5, the interference signal is generated in some specific time durations only, for example, when the speaker's sound appears. Thus the original voice signal is interfered only in these specific time durations. This approach can save more energy and cause less interference to others. In another alternative approach shown in FIG. 6, the interference signal is generated based on the frequency band of the speaker voice, for example, with shaped interference's spectrum, thereby the original voice signal is interfered in its own frequency. Compared to the approach in FIG. 4, this approach also saves the energy from frequency domain and causes less interference to others. FIG. 7 shows another alternative approach, in which the interference added to the original voice can be some words that are randomly selected from the sentences previously spoken by the speaker. In this way, the disturbed voice is like talking nonsense and hard to understood by a listener.

Referring back to FIG. 2, since the EN is measurable and the additional signal, if any, is generated by the user device of the first user, the interference signal is subtracted from the combined signal. Thus, the first voice signal can be extracted from the combined signal in block 204 based at least in part on the interference signal. In block 206, the extracted first voice signal can be transmitted to the second user. Thus the second user at the other end of the call can hear the voice of the first user. In an exemplary embodiment, the extracted first voice signal can be provided to the first user along with a second voice signal from the second user. As such, the first user can hear his/her own words when he/she is communicating with the second user. Additionally or alternatively, the second voice signal provided to the first user can be properly delayed so as to eliminate the latency of local signal processing at the first user.

It will be appreciated that the interference signal can be adjusted adaptively according to changes of the first voice signal and the EN during the communication between the first user and the second user. For example, the EN and the first voice signal from the first user can be continuously evaluated, and the interference signal needed to prevent the first voice signal from being overheard by people near the first user can be dynamically determined according to the evaluation, and thus the additional signal as a part of interference can be generated adaptively as well. This procedure can be considered as a process of adaptive filtering. With the approach illustrated with respect to FIG. 2, the first user can make private calls using his/her phone (such as cell phone or land phone) in a public area more secure, so that the conversation between the first user and the second user cannot be understood by unintended listeners.

Figure 8:
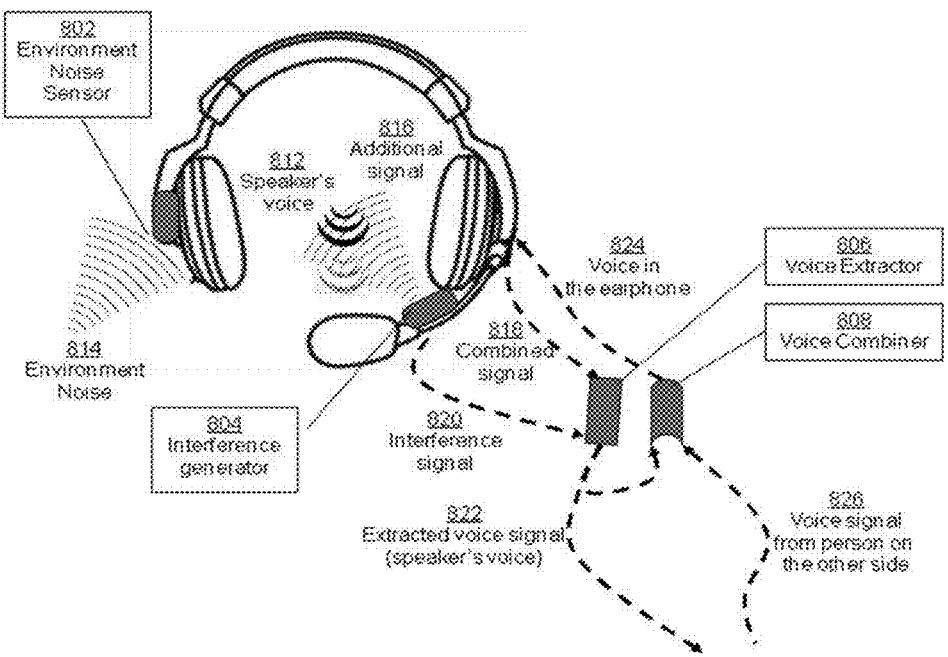
FIG. 8 is a diagram illustrating an exemplary implementation on a headset device independent to a phone, in accordance with an embodiment of the present invention.

FIG. 8 is a diagram illustrating an exemplary implementation on a headset device independent to a phone, in accordance with an embodiment of the present invention. It is noted that the device designed in accordance with exemplary embodiments of the present invention is not limited to be implemented on headset devices. It also can be a component of any communication apparatus required to prevent from overhearing. For example, the designed device can be integrated into any landline phones or mobile phones. The headset device shown in FIG. 8 can include some conventional components to support its normal operations, such as microphone, earphone and/or the like. In particular, the headset device according to the exemplary embodiment can include the following four components: an EN sensor 802, an interference generator 804, a voice extractor 806, and a voice combiner 808. It will be realized that the capabilities and functions of these four components can be implemented by means of more or less components, or alternative components. The dashed line in FIG. 8 exemplarily shows the signal flow transmitted among those components.

According to the exemplary embodiment, the EN sensor 802 can collect the EN 814 and send it to the interference generator 804. Thereby the interference generator 804 can adapt to the EN 814 and optionally generate an additional signal 816 so as to successfully make a speaker's voice 812 not understandable without bothering other people too much. It will be realized that generation of the additional signal 816 can not be necessary when the EN 814 is strong enough to make the speaker's voice 812 incomprehensible.

The interference generator 804 can generate an extra interference signal such as the additional signal 816 based at least in part on the characteristics of the speaker's voice and the EN, for example via training and adaptive filtering as described with respect to FIG. 2. Physically, the interference invention can be placed close to the speaker's mouth. During the call, it sends out the appropriate additional signal that can be added with the speaker's voice and the EN to form a combined signal 818. In an exemplary embodiment, training and adaptive filtering can be supported by the interference generator 804, and the generated interference also can adaptively adapt to the speaker's voice and the EN.

After the combined signal 818 is collected from a microphone of the headset device, the voice extractor 806 can revert it to the speaker's original voice based at least in part on the interference signal 820 which can include the EN 814 and optionally the additional signal 816. Since the additional signal 816 is generated by the device itself and the EN 814 can be measured by the EN sensor 802, it is easy to extract the speaker's voice from the combined signal 818 by signal subtraction, for example by subtracting the EN 814 and optionally the generated additional signal 816 from the combined signal 818. In this way, the supported voice level to interference level ratio can be very high. The extracted voice signal 822 (corresponding to the speaker's original voice) can be transmitted to the other person in the call via the phone device. Importantly, the extracted voice signal 822 is also played in an earphone so that the speaker can hear his/her own words.

The voice combiner 808 can properly combine the incoming voice signal 826 of the other person at the other end of the call and the extracted voice signal 822, for example as a voice 824 in the speaker's earphone, such that no overlap or interference would exist between these two types of voice signals. Optionally, the deliberate delay on the voice signal of the other person can be required for proper signal alignment. The amount of delay can depend on the processing time of voice extraction.

Figure 9:
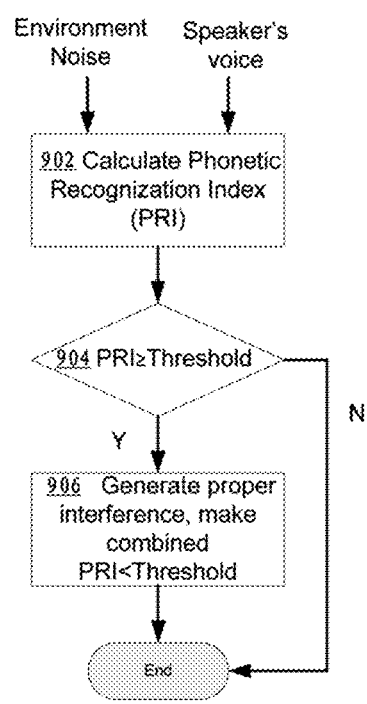
FIG. 9 exemplarily shows the process of interference signal generation in accordance with an embodiment of the present invention.

FIG. 9 exemplarily shows the process of interference signal generation in accordance with an embodiment of the present invention. The interference signal with respect to a speaker's voice signal can be determined and generated by evaluating the quality of the speaker's voice signal, such as the power/energy intensity of the speaker's voice signal relative to the EN. Thus, the minimum level of interference can depend on the EN. For example, no extra interference needs to be generated if the EN is strong enough comparing with the speaker's voice. According to the exemplary embodiment, given the speaker's voice and the EN, a parameter called Phonetic Recognition Index ("PRI") can be introduced to evaluate the voice quality of the speaker. There can be multiple ways to calculate PRI, and Table 1 shows some examples.

TABLE 1

| Expression of PRI | Description |
| --- | --- |
| PRI = Voice Level/EN Level | Consider the whole signal noise ratio |
| PRI = Voice Level of its frequency band/EN Level of its frequency band | Consider it in Frequency Domain |
| PRI = Voice Level in specified time duration/EN Level in specified time duration | Consider it in Time Domain |
| PRI = Voice Level of its frequency band in specified time duration/EN Level of its frequency band in specified time duration | Consider it in both Frequency & Time Domains |

In the exemplary embodiment, the EN and the speaker's voice can be continuously evaluated, and an evaluation parameter such as PRI can be calculated in block 902, for example, with an example expression illustrated in Table 1. A threshold for deciding whether an additional signal needs to be generated as interference can be predefined or predetermined, for example from training or empirical study. If the value of PRI calculated in block 902 is not less than the threshold in block 904, it means that the speaker's voice can still be understood by people nearby, and the process proceeds to block 906. In this case, the additional signal needs to be generated as interference, such that after adding the EN and the generated interference signal, the combined PRI is less than the threshold. The combined PRI can be calculated by changing denominator of PRI from the EN to the combination of the EN and the generated interference signal. In other words, the difference with PRI is that the divider of the combined PRI is the sum of the EN and the extra generated interference. According to the exemplary embodiment, the interference can be generated in terms of frequency, time, strength and/or any other perspectives. Some alternatives such as those illustrated with respect to FIGS. 4-7 can be utilized to generate the interference signal. Preferably, the interference signal can adapt to the speaker's voice and the EN at the time of calling. If the value of PRI is less than the threshold in block 904, it means that the EN is large enough and the speaker's voice cannot be understood by people nearby without generating the additional interference signal, and thus the process ends.

The solution in accordance with the exemplary embodiments can create a method and apparatus for enabling a private phone conversation in a public place. Particularly, when the interference mode is on, a phone device in accordance with the exemplary embodiments can adaptively generate and send out the interference signal according to the quality of a speaker's voice signal. The speaker's voice signal can be "added" with the interference signal and become a combined signal not understandable. The combined signal collected by a microphone of the phone device can be processed to extract the original voice signal, given the interference signal is known. This allows the original voice signal being restored and transmitted, so that the person at the other end of the call can hear the speaker's voice. The speaker's original voice, as the extracted signal, would be also played in an earphone of the phone device, in order to let the speaker hear his/her own words. Also, the speaker's voice in the earphone would not be overlapped with the voice from the other person in the call. Particularly, in order to generate "just-enough" amount of interference and achieve good interference performance, training can be needed. For example, by asking the speaker to read at least one sample sentence. Thus, the interference signal can be determined by analyzing the characteristics of the speaker's voice. Furthermore, the interference signal can be adaptively adjusted during the call to better adapt to the speaker's voice and the EN, and reduce the interference level as much as possible. For providing a great user experience, the interference signal can be generated from background music and self-adaptively disturb or cancel the speaker's voice according to the features of the voice. According to an exemplary embodiment, cloud services can be used as a backend supporting for storage, computing and analysis.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of at least one programming language, including an object oriented programming language such as Smalltalk, C++, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes at least one executable instruction for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a combined signal comprising an interference signal and a first voice signal from a first user having a communication with a second user, wherein the interference signal is used to prevent the first voice signal from being overheard by people near the first user;
   extracting the first voice signal from the combined signal based at least in part on the interference signal; and
   transmitting the extracted first voice signal to the second user.

2. The method according to claim 1, wherein the interference signal comprises an environment noise of the first user.

3. The method according to claim 2, further comprising:
   in response to quality of the first voice signal relative to the environment noise being higher than a predetermined threshold, generating an additional signal based at least in part on the first voice signal and the environment noise; and
   sending out the additional signal;
   wherein the interference signal further comprises the additional signal.

4. The method according to claim 3, wherein the additional signal is associated with at least one of: voice characteristics of the first user in time domain, voice characteristics of the first user in frequency domain, and words spoken by the first user.

5. The method according to claim 1, wherein the extracted first voice signal is provided to the first user along with a second voice signal from the second user.

6. The method according to claim 1, wherein the interference signal is adjusted adaptively according to changes of the first voice signal and the environment noise during the communication between the first user and the second user.

7. A system comprising:
   one or more processors;
   a memory coupled to at least one of the processors; and
   a set of computer program instructions stored in the memory and executed by at least one of the processors in order to perform actions of:
   receiving a combined signal comprising an interference signal and a first voice signal from a first user having a communication with a second user, wherein the interference signal is used to prevent the first voice signal from being overheard by people near the first user;
   extracting the first voice signal from the combined signal based at least in part on the interference signal; and
   transmitting the extracted first voice signal to the second user.

8. The system according to claim 7, wherein the interference signal comprises an environment noise of the first user.

9. The system according to claim 8, wherein the set of computer program instructions are executed by at least one of the processors in order to further perform an action of:
   in response to quality of the first voice signal relative to the environment noise being higher than a predetermined threshold, generating an additional signal based at least in part on the first voice signal and the environment noise; and
   sending out the additional signal;
   wherein the interference signal further comprises the additional signal.

10. The system according to claim 9, wherein the additional signal is associated with at least one of: voice characteristics of the first user in time domain, voice characteristics of the first user in frequency domain, and words spoken by the first user.

11. The system according to claim 7, wherein the extracted first voice signal is provided to the first user along with a second voice signal from the second user.

12. The system according to claim 7, wherein the interference signal is adjusted adaptively according to changes of the first voice signal and the environment noise during the communication between the first user and the second user.

13. A non-transitory computer program product comprising a computer readable storage medium having program instructions embodied therewith which, when executed, cause a processor to cause a user device to:
   receive a combined signal comprising an interference signal and a first voice signal from a first user having a communication with a second user, wherein the interference signal is used to prevent the first voice signal from being overheard by people near the first user;
   extract the first voice signal from the combined signal based at least in part on the interference signal; and
   transmit the extracted first voice signal to the second user.

14. The non-transitory computer program product according to claim 13, wherein the interference signal comprises an environment noise of the first user.

15. The non-transitory computer program product according to claim 14, wherein the program instructions are executable by the processor to cause the user device further to:
   in response to quality of the first voice signal relative to the environment noise being higher than a predetermined threshold, generate an additional signal based at least in part on the first voice signal and the environment noise; and send out the additional signal, wherein the interference signal further comprises the additional signal.

16. The non-transitory computer program product according to claim 15, wherein the additional signal is associated with at least one of: voice characteristics of the first user in time domain, voice characteristics of the first user in frequency domain, and words spoken by the first user.

17. The non-transitory computer program product according to claim 13, wherein the extracted first voice signal is provided to the first user along with a second voice signal from the second user.

18. The non-transitory computer program product according to claim 13, wherein the interference signal is adjusted adaptively according to changes of the first voice signal and the environment noise during the communication between the first user and the second user.

\* \* \* \* \*